US011757361B2

(12) United States Patent
Somani et al.

(10) Patent No.: US 11,757,361 B2
(45) Date of Patent: *Sep. 12, 2023

(54) DC/DC CONVERTER AND CONTROL THEREOF

(71) Applicant: DYNAPOWER COMPANY LLC, South Burlington, VT (US)

(72) Inventors: Apurva Somani, South Burlington, VT (US); Xiaorong Xia, South Burlington, VT (US); Anup Thapa, South Burlington, VT (US); Gysler Castelino, South Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,839

(22) Filed: Jul. 21, 2020

(65) Prior Publication Data

US 2021/0006164 A1   Jan. 7, 2021

Related U.S. Application Data

(63) Continuation of application No. 15/895,565, filed on Feb. 13, 2018, now Pat. No. 10,749,435.

(Continued)

(51) Int. Cl.
*H02M 3/158* (2006.01)
*H02J 7/35* (2006.01)
(Continued)

(52) U.S. Cl.
CPC ......... *H02M 3/1582* (2013.01); *G05B 19/05* (2013.01); *H02J 7/0071* (2020.01); *H02J 7/35* (2013.01);
(Continued)

(58) Field of Classification Search
CPC ................................................... H02M 3/1582
(Continued)

(56) References Cited

U.S. PATENT DOCUMENTS 6,437,462 B1 * 8/2002 Maple ................ H02M 3/1584
307/80
7,768,245 B1   8/2010 De Cremoux
(Continued)

FOREIGN PATENT DOCUMENTS

CN   101060285 A   10/2007
CN   101647181 A   2/2010
(Continued)

OTHER PUBLICATIONS

International Preliminary Report on Patentability dated Nov. 19, 2019; PCT/US2018/017964.
(Continued)

*Primary Examiner* — Jerry D Robbins
(74) *Attorney, Agent, or Firm* — Mark H. Williams

(57) ABSTRACT

A DC/DC converter system includes a bidirectional DC/DC converter converting between voltage levels at first and second ports and a control system for controlling the DC/DC converter. The bidirectional DC/DC converter includes a first conversion stage connected to the first port and a second conversion stage interfaced with the first conversion stage and connected to the second port. The control system includes outer and inner control loops. The outer control loop compares a command for one of a voltage level, a current level or power at one of the first and second ports to an actual value of voltage level, current level or power level and outputs an interface current command based on the comparison. The inner control loop compares the interface current command to an actual interface current at an inter-
(Continued)

face of the first and second conversion stages, and controls a switching signal duty value based on the comparison.

25 Claims, 7 Drawing Sheets

Related U.S. Application Data

(60) Provisional application No. 62/506,315, filed on May 15, 2017.

(51) Int. Cl.
*H02M 3/335* (2006.01)
*H02M 1/08* (2006.01)
*G05B 19/05* (2006.01)
*H02M 1/14* (2006.01)
*H02J 7/00* (2006.01)
*H02M 1/00* (2006.01)

(52) U.S. Cl.
CPC .............. *H02M 1/08* (2013.01); *H02M 1/14* (2013.01); *H02M 3/33584* (2013.01); *G05B 2219/13095* (2013.01); *H02J 7/0068* (2013.01); *H02M 1/0009* (2021.05); *H02M 1/0054* (2021.05)

(58) Field of Classification Search
USPC ........................................ 320/101
See application file for complete search history.

(56) References Cited

U.S. PATENT DOCUMENTS

| | | | | |
|---|---|---|---|---|
| 9,602,021 | B2* | 3/2017 | Chaudhuri | H02M 5/4585 |
| 9,893,633 | B1* | 2/2018 | Li | H02M 3/33546 |
| 10,320,294 | B2 | 6/2019 | Jiang et al. | |
| 2002/0024824 | A1* | 2/2002 | Reinold | H02M 3/285 |
| | | | | 363/17 |
| 2002/0101745 | A1* | 8/2002 | Seki | H02M 3/1582 |
| | | | | 363/65 |
| 2003/0132736 | A1 | 7/2003 | O'Mara et al. | |
| 2004/0212357 | A1* | 10/2004 | Crocker | H02M 3/1582 |
| | | | | 323/282 |
| 2006/0273768 | A1 | 12/2006 | Chen et al. | |
| 2007/0085519 | A1 | 4/2007 | Xu | |
| 2009/0102441 | A1 | 4/2009 | de Cremoux et al. | |
| 2010/0309698 | A1* | 12/2010 | Asplund | H02M 7/797 |
| | | | | 363/126 |
| 2012/0033461 | A1* | 2/2012 | Papafotiou | H02J 3/36 |
| | | | | 363/35 |
| 2013/0099572 | A1* | 4/2013 | Norrga | H02M 7/4835 |
| | | | | 307/43 |
| 2014/0003095 | A1 | 1/2014 | Thomas et al. | |
| 2014/0140104 | A1* | 5/2014 | Norrga | H02M 3/33584 |
| | | | | 363/16 |
| 2014/0232361 | A1 | 8/2014 | Dally | |
| 2015/0015181 | A1 | 1/2015 | Kondo et al. | |
| 2015/0244259 | A1 | 8/2015 | Kaiser et al. | |
| 2016/0072312 | A1 | 3/2016 | Ichikawa et al. | |
| 2016/0094121 | A1* | 3/2016 | Cowley | H02M 3/156 |
| | | | | 323/273 |
| 2016/0329811 | A1 | 11/2016 | Du et al. | |
| 2017/0063251 | A1 | 3/2017 | Ye et al. | |
| 2017/0085189 | A1 | 3/2017 | Madsen | |

FOREIGN PATENT DOCUMENTS

| | | |
|---|---|---|
| CN | 102222958 A | 10/2011 |
| CN | 105790588 A | 7/2016 |
| EP | 1998428 A1 | 12/2008 |
| JP | 2006254518 A | 9/2006 |
| JP | 2014508495 A | 4/2014 |
| JP | 2015162951 A | 9/2015 |
| JP | 2017511679 A | 4/2017 |
| RU | 2008141777 A | 3/2006 |
| TW | 201117539 A | 5/2011 |
| TW | 201628325 A | 8/2016 |
| WO | 2013/121665 A1 | 8/2013 |

OTHER PUBLICATIONS

The International Search Report and Written Opinion dated May 3, 2018; PCT/US2018/017964.
Notice of Allowance dated Sep. 30, 2022 JP2019-563624.
The First Chinese Office Action dated Feb. 22, 2023; Appln. No. 201880046888.9.
Korean Non-Final Rejection dated Nov. 4, 2022; Appln. No. 10-2019-7037050.
Notice of Allowance dated Feb. 26, 2021; ZA2019/08321.
Notice of Allowance dated Jun. 30, 2021; NZ 760094.
Indian Office Action dated Feb. 14, 2022; Appln. No. 201917051853.
Japanese Office Action dated Feb. 2, 2022; Appln: JP2019-563624.
European Office Action dated Mar. 21, 2022; Appln. No. 18 707 538.7.
Australian Examination Report No. 1 dated May 13, 2022; Appln. No. 2018268716.
Patent examination report 1 from the New Zealand Patent office dated Sep. 2, 2020; Appln. No. 760094.
Patent examination report 2 from the New Zealand Patent office dated Apr. 6, 2021; Appln. No. 760094.
M.G. Anand et al.; "A DC-DC Quad Active Bridge Converter Based Hybrid Energy Storage Systems", International Journal of P2P Network Trends and Technology (IJPTT)—vol. 5—Feb. 2014; 5 pages.

* cited by examiner

DC/DC CONVERTER AND CONTROL THEREOF

This application is a continuation of U.S. application Ser. No. 15/895,565, filed Feb. 13, 2018, now allowed, which claims the benefit of U.S. Provisional Application No. 62/506,315, filed May 15, 2017, the entireties of which are hereby incorporated herein by reference. Any disclaimer that may have occurred during the prosecution of the above-referenced application(s) is hereby expressly rescinded

BACKGROUND OF THE INVENTION

Electric power conversion devices and associated control systems are used to interface various energy resources. For example, a power system can include a variety of interconnected distributed energy resources (e.g., power generators and energy storage units) and loads. The power system may also connect to a utility grid or a microgrid system. The power system employs the electric power conversion to convert power between these energy resources (e.g., AC/DC, DC/DC, AC/AC and DC/AC).

In power electronics, a DC/DC converter converts a source from one voltage level to another. DC/DC converters include step-down (buck) converters in which the output voltage is lower than the input voltage and step-up (boost) converters in which the output voltage is higher than the input voltage. DC/DC converters employ various topologies to step up or step down an input voltage to a desired output voltage. For example, a DC/DC converter may employ a switching topology in which switches such as IGBTs receive gate signals to convert the input voltage to a desired output voltage. DC/DC converters may be used in various applications, including microgrid applications in which the DC/DC converter converters the voltage output from a source of energy to a voltage that is appropriate for the microgrid.

BRIEF DESCRIPTION OF THE FIGURES (NON-LIMITING EMBODIMENTS OF THE DISCLOSURE)

Advantages of the present invention will be readily appreciated, as the same becomes better understood by reference to the following detailed description when considered in connection with the accompanying drawings, wherein.

BRIEF SUMMARY OF THE INVENTION

Figure 1:
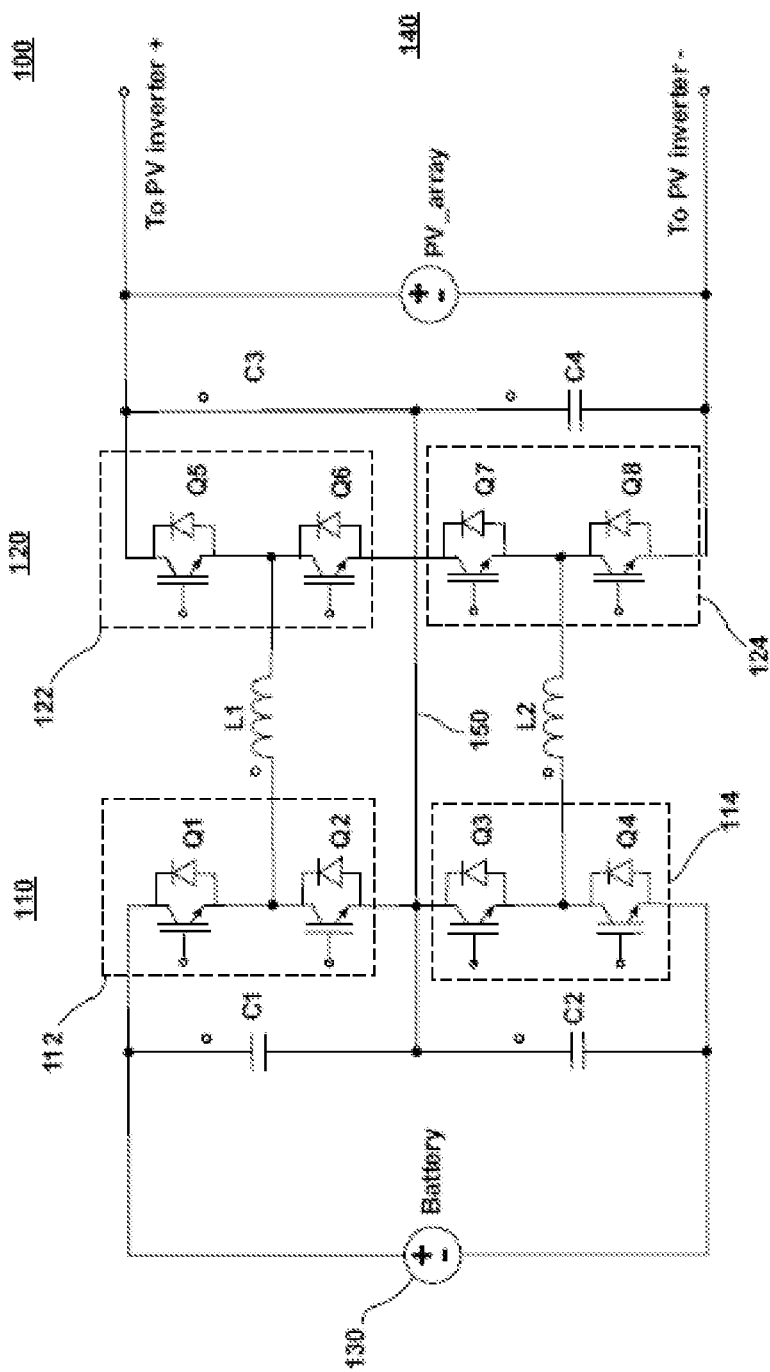
FIG. 1 is a schematic diagram of a DC/DC converter according to an embodiment of the present invention.

Embodiments of the present invention include a DC/DC converter in which a voltage magnitude at one port can be controlled to be higher than, the same, and lower than the voltage at the opposing port.

In one aspect, a DC/DC converter system includes a bidirectional DC/DC converter for converting between voltage levels at first and second ports and a control system for controlling the DC/DC converter. The bidirectional DC/DC converter includes a first conversion stage connected to the first port and comprising a plurality of switches; and a second conversion stage interfaced with the first conversion stage, the second conversion stage being connected to the second port and comprising a plurality of switches. The control system includes an outer control loop unit configured to compare a command for any one of a voltage level, a current level or power at one of the first port and the second port to an actual value of voltage level, current level or power level at the one of the first port and the second port and outputting an interface current command based on the comparison; and an inner control loop unit configured to compare the interface current command to an actual value of interface current at an interface of the first and second conversion stages, and controlling a switching signal duty value based on the comparison.

The inner control loop of the DC/DC converter system may include a first conversion stage controller and a second conversion stage controller, and the inner control unit may be configured to: compare the interface current command to an interface current comparison value to generate first and second interface current commands; compare the first and second interface current commands to the actual value of interface current, wherein: the first conversion stage controller controls a duty value of a switching signal for the first conversion stage according to the comparison of the first interface current command and the actual value of interface current; and the second conversion stage controller controls a duty value of a switching signal for the second conversion stage according to a comparison of the second interface current command and the actual value of interface current.

In comparing the interface current command to an interface current comparison value, the inner control loop unit may be configured to: subtract the interface current comparison value from the interface current command to generate the first interface current command; add the interface current comparison value to the interface current command to generate the second interface current command; compare the first interface current command to the actual value of interface current, and control, by the first conversion stage controller, the duty value of the switching signal for the first conversion stage based on the comparison; and compare the second interface current command to the actual value of the interface current, and control, by the second conversion stage controller, the duty value of the switching signal for the second conversion stage based on the comparison.

The first conversion stage controller and the second conversion stage controller may include one of a proportional-integral-derivative (PID) controller, proportional-integral (PI) controllers, a proportional (P) controller, and a hysteresis controller.

The outer control loop may include one of a proportional-integral-derivative (PID) controller, proportional-integral (PI) controllers, a proportional (P) controller, and a hysteresis controller for receiving the comparison of the command for voltage or current and the actual voltage or current to control the interface current.

The first conversion stage may convert a voltage at the first port to an output voltage that is output at the second port when the voltage at the first port is higher than the voltage at the second port. The second conversion stage may convert a voltage at the second port to an output voltage that is output at the second port when the voltage at the second port is higher than the voltage at the first port. Each of the first conversion stage and the second conversion stage may operate to control the voltages at the first and second ports when the voltages at the first and second port are substantially the same.

The first conversion stage may include a first half bridge and a second half bridge connected in series between a first terminal and a second terminal of a first port. The second conversion the second conversion stage comprises a third half bridge and a fourth half bridge connected in series between a third terminal and a fourth terminal of a second port.

The first half bridge may include a pair of first switches connected in series between a first terminal of the input port and a junction of the first half bridge, and the second half bridge comprises a pair of second switches connected in series between a junction of the first half bridge and a second half bridge. The third half bridge may include a pair of switches connected in series between a junction of the third half bridge and the fourth half bridge, and the fourth half bridge may include a pair of switches connected in series between a junction of the third half bridge and the fourth half bridge.

The first conversion stage and the second conversion stage may be interfaced through first and second inductors or an isolation transformer.

When the first conversion stage and the second conversion stage are interfaced through first and second inductors, the first inductor may have a first terminal connected to a junction of the pair of first switches and a second terminal connected to the junction of the pair of third switches; and a second inductor having a first terminal connected to a junction of the pair of second switches and a second terminal connected to the pair of fourth switches.

When the first conversion stage and the second conversion stage are interfaced through an isolation transformer, one side of a first winding of the isolation transformer may be connected to the junction of the pair of switches of the first half bridge, and the other side of the first winding may be connected to the junction of the pair of switches of the second half bridge; and one side of a second winding of the isolation transformer may be connected to the junction of the pair of switches of the third half bridge, and the other side of the second winding may be connected to the junction of the pair of switches of the fourth half bridge.

The first conversion stage may be connected to an energy storage unit at the first port, and the second conversion stage may be connected to a PV array at the second port.

The DC/DC converter system may also include: a first capacitor coupled to the first half bridge; a second capacitor coupled to the second half bridge; and the control system may further comprise a capacitance control system for controlling a voltage difference between a voltage across the first capacitor and a voltage across the second capacitor, the capacitance control system being configured to: calculate a difference between the voltage across the first capacitor and the voltage across the second capacitor; calculate a duty ratio offset according to the difference between the voltage across the first capacitor and the voltage across the second capacitor; apply the duty ratio offset to the duty value output by the first conversion stage controller.

The DC/DC converter system may also include: a third capacitor coupled to the third half bridge; a fourth capacitor coupled to the fourth half bridge; and the control system may further comprise a capacitance control system for controlling a voltage difference between a voltage across the third capacitor and a voltage across the fourth capacitor, the capacitance control system being configured to: calculate a difference between the voltage across the first capacitor and the voltage across the second capacitor; calculate a duty ratio offset according to the difference between the voltage across the first capacitor and the voltage across the second capacitor; apply the duty ratio offset to the duty value output by the first conversion stage controller.

In another aspect, a method for controlling a bidirectional DC/DC converter, which includes a first conversion stage connected to a first port and interfaced with a second conversion stage connected with a second port wherein each of the first and second conversion stages comprises a plurality of switches, includes: comparing a command for current, voltage or power at one of the first and second ports to an actual value of current, voltage or power at the one of the first and second ports, and controlling an interface current command based on the comparison; and comparing the interface current command to an actual value of an interface current at an interface of the first and second conversion stages, and controlling a switching signal based on the comparison.

Comparing the interface current command to an actual value of an interface current at an interface of the first and second conversion stages, and controlling a switching signal based on the comparison may include: comparing the interface current command to an interface current comparison value to generate first and second interface current commands; comparing the first and second interface current commands to the actual value of interface current; controlling a duty value of a switching signal for the first conversion stage according to the comparison of the first interface current command and the actual value of interface current; and controlling a duty value of a switching signal for the second conversion stage according to a comparison of the second interface current command and the actual value of interface current.

Comparing the interface current command to an interface current comparison value to generate first and second interface current commands and controlling the duty values of switching signals for the first and second conversion stages may include: subtracting the interface current comparison value from the interface current command to generate the first interface current command; adding the interface current comparison value to the interface current command to generate the second interface current command; comparing the first interface current command to the actual value of interface current, and controlling the duty value of the switching signal for the first conversion stage based on the comparison; and comparing the second interface current command to the actual value of the interface current, and controlling the duty value of the switching signal for the second conversion stage based on the comparison.

The first conversion stage may be connected to an energy storage unit at the first port, and the second conversion stage may be connected to a PV array at the second port.

In another aspect, a DC/DC converter may include a first conversion stage and a second conversion stage. The first conversion stage includes a first half bridge and a second half bridge connected in series between a first terminal and a second terminal of a first port. The second conversion stage is coupled to the first conversion stage, the second conversion stage comprising a third half bridge and a fourth half bridge connected in series between a third terminal and a fourth terminal of a second port. The first conversion stage is operative to convert a first voltage at the first port to an desired output voltage that is output at the second port when the magnitude of the first voltage at the first port is higher than the magnitude of a second voltage at the second port. The second conversion stage is operative to convert the second voltage at the second port to a desired voltage output voltage that is output at the first port when the magnitude of the second voltage at the second port is greater than the magnitude of the first voltage at the first port.

The first conversion stage may be connected to the second conversion stage such that the first, second, third and fourth half bridges form a cascaded connection of series half-bridges.

The first half bridge may include a pair of first switches connected in series between the first terminal of the input port and a junction of the first half bridge and the second half bridge.

The second half bridge may include a pair of second switches connected in series between the second terminal of the first port and a junction of the first half bridge and the second half bridge.

The third half bridge may include a pair of switches connected in series between the first terminal of the second port and a junction of the third half bridge and the fourth half bridge.

The fourth half bridge may include a pair of switches connected in series between the second terminal of the second port a junction of the third half bridge and the fourth half bridge.

The DC/DC converter may further include: a first inductor having a first terminal connected to a junction of the pair of first switches and a second terminal connected to the junction of the pair of third switches; and a second inductor having a first terminal connected to a junction of the pair of second switches and a second terminal connected to the pair of fourth switches.

The DC/DC converter may further include: first and second capacitors close coupled to the first and second half bridges; and third and fourth capacitors close coupled to the third and fourth have bridges.

The first conversion stage and the second conversion stage may be interfaced through an isolation transformer, and one side of a first winding of the isolation transformer is connected to the junction of the pair of switches of the first half bridge, and the other side of the first winding is connected to the junction of the pair of switches of the second half bridge, and one side of a second winding of the isolation transformer is connected to the junction of the pair of switches of the third half bridge, and the other side of the second winding is connected to the junction of the pair of switches of the fourth half bridge.

The first port may be configured to be coupled to an energy storage unit and the second port may be configured to be coupled to a photovoltaic array.

DETAILED DESCRIPTION

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

A typical DC/DC converter may be connected to a source, such as a battery, so that the source voltage can be increased (or decreased) to an intermediate DC bus. For example, if a battery voltage ranges from 300-600V, the DC/DC converter may boost this voltage to an output voltage such as 800V at an intermediate DC bus. Such designs require that the output voltage be always higher than the input voltage, while current control can be in either direction (e.g., to charge or discharge the battery). Such designs are restricted to either increasing or decreasing the source voltage Embodiments of the present invention include a DC/DC converter that is not limited to either a boost (i.e., increase) or buck (i.e., decrease) operation. The DC/DC converter includes first and second ports with a topology and control system that allow flexibility, in that a voltage magnitude at one port can be controlled to be higher than, the same, and lower than the voltage at the opposing port.

Embodiments of the present invention include a DC/DC converter and a control system having a control structure for controlling the DC/DC converter to output a desired current, voltage or power reference. Embodiments of the present invention include a DC/DC converter and control system that enables interfacing of high voltage energy storage (e.g., batteries) and photovoltaic (PV) arrays while utilizing lower voltage rating switches (e.g., semiconductor devices such as insulated-gate bipolar transistors (IGBTs), metal-oxide-semiconductor field-effect transistors (MOSFETs), etc. Embodiments of the present invention also include a DC/DC converter and control system that enables interfacing energy storage (e.g., batteries) with PV arrays, where the output/input voltage of the energy storage and the output voltage of the PV arrays have overlapping voltage magnitudes.

Referring to FIG. 1, a DC/DC converter 100 according to an embodiment of the present invention may include a first conversion stage 110 and a second conversion stage 120 connected to each other. The first conversion stage is connected to a first port 130, which may in turn be connected to a power source such as an energy storage unit (e.g., a battery). The second conversion stage is connected to a second port 140, which may in turn be connected to a power source such as a photovoltaic (PV) array or another power converter (e.g., a power inverter) or a load. The first and second conversion stages 110, 120 form a bi-directional DC/DC converter (i.e., the power flow is bidirectional). In the embodiment shown in FIG. 1, the magnitude of the voltage on the first converting stage 110 at the first port 130 can be higher or lower than or substantially equal (i.e., close to equal) to the magnitude of the voltage on the second converting stage at the second port 140. Thus, either side of the DC/DC converter 100 can be used as a buck or a boost converter. It should be noted that, although FIG. 1 illustrates a battery and a PV-array connected to the first and second ports 130 and 140, different sources and/or loads may instead be connected to the first and second ports 130 and 140, and thus, the invention is not limited as such.

In an embodiment, the first conversion stage 110 is operative to convert the voltage at the first port 130 to a desired magnitude (i.e., output voltage) at the port 140 when the magnitude of the voltage of the port 130 is higher than the magnitude of the voltage at the port 140. This conversion may be accomplished using any one of a current command, a voltage command or a power reference that is compared to a feedback signal. The second conversion stage 120 is operative to convert the port 140 voltage to a desired magnitude at the port 130 when the magnitude of the voltage at port 140 is greater than the magnitude of the voltage at port 130. This conversion may be accomplished using any one of a current command, a voltage command or a power reference that is compared to a feedback signal.

Accordingly, the DC to DC converter may be implemented in a design where the voltage magnitude at either port may range up to a predetermined voltage, e.g., 1500V on either side. In this example, the voltages on either port 130, 140 could be controlled to be any voltage up to 1500 V while also being able to control the power flow in the DC to DC converter (i.e., control the direction of the current). Thus, for example on port 130, the voltage can be 800 V, and on port 140, the voltage can be 1500 V, and the current can be controlled to be in either direction (e.g., to either charge or discharge a power source). Similarly, port 130 can be at 1500 V and port 140 can be at 800 V, and current can be controlled to be in either direction. Finally, the voltage magnitude at port 130 can be the substantially equal to the voltage magnitude at port 140, and the current can be controlled to be in either direction.

In an embodiment, the DC/DC converter 100 comprises two sets of cascaded half bridges. The first conversion stage 110 comprises a first half bridge 112 and a second half bridge 114 connected in series. Each of the first half bridge 112 and the second half bridge 114 may comprise a pair of switches Q1, Q2 and Q3, Q4. The second converting stage 120 comprises a third half bridge 122 and a fourth half bridge 124 that are connected in series. Each of the third half bridge 122 and the fourth half bridge 124 may comprise a pair of switches Q5, Q6 and Q7, Q8.

In the embodiment illustrated in FIG. 1, the pair of switches Q1, Q2 of the first half bridge 112 are connected in series between a first terminal of the first port 130 and a junction of the first half bridge 112 and the second half bridge 114 (i.e., node connecting first half bridge to second half bridge). The pair of switches Q3, Q4 of the second half bridge 114 are connected in series between the junction of the first half bridge 112 and the second half bridge 114 (i.e., node connecting first half bridge to second half bridge) and a second terminal of the port 130. The pair of switches of the third half bridge 122 are connected in series between a first terminal of the second port 140 and a junction of the third half bridge 122 and the fourth half bridge 124. The pair of switches of the fourth half bridge 124 are connected between the junction of the third half bridge 122 and the fourth half bridge 124 and a second terminal of the second port 140.

In an embodiment, the first conversion stage 110 and the second conversion stage are interfaced using first and second inductors L1 and L2. One terminal of the first inductor L1 is connected to the junction of the pair of switches Q1, Q2 of the first half bridge 112 (i.e., the node connecting the switches Q1 and Q2). The other terminal of the first inductor L1 is connected to the junction of the pair of switches of the third half bridge 122. One terminal of the second inductor L2 is connected to the junction of the pair of switches Q3, Q4 of the second half bridge 114, and the other terminal of the second inductor is connected to the junction of the pair of switches Q7, Q8 of the fourth half bridge 124.

Figure 2:
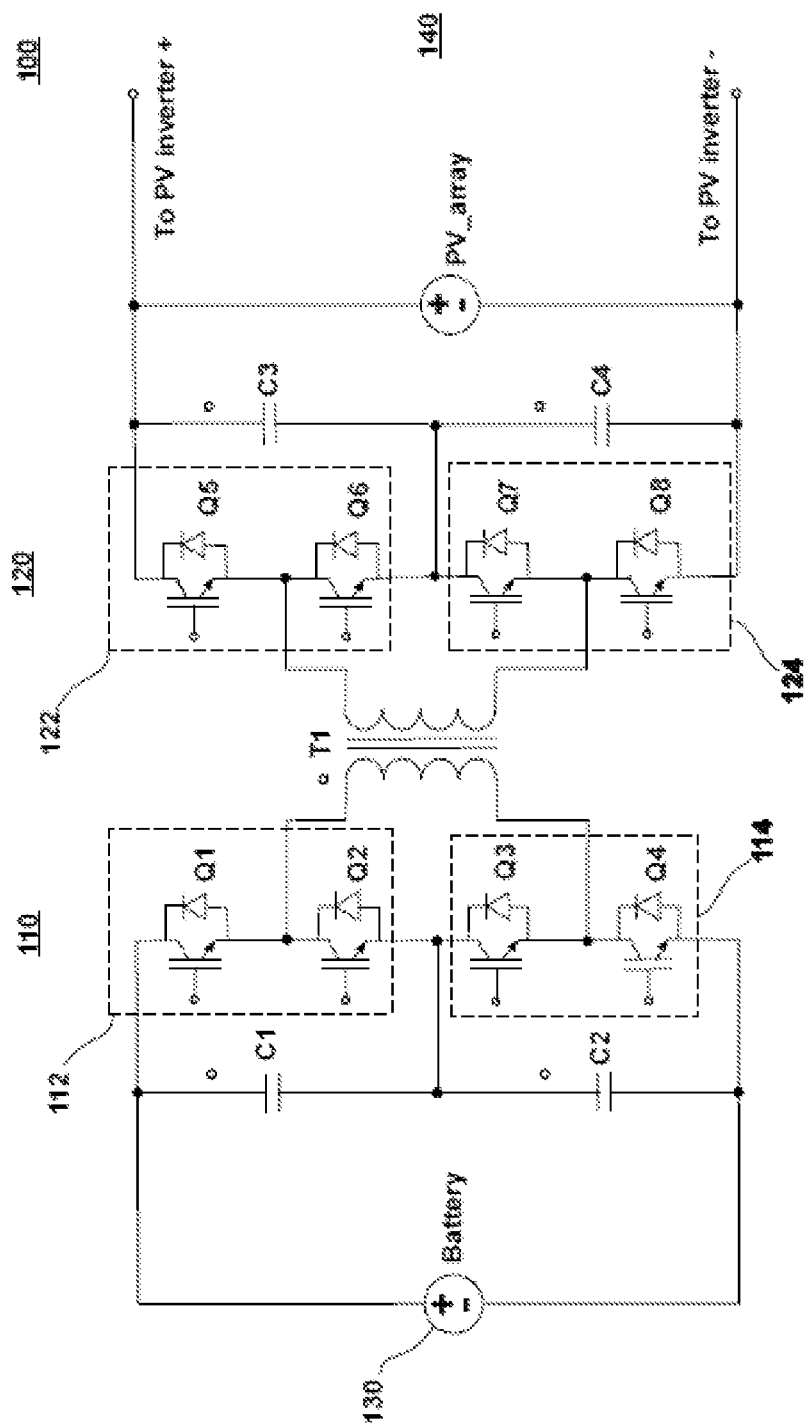
FIG. 2 is a schematic diagram of a DC/DC converter according to another embodiment of the present invention.

In another embodiment, the first and second inductors L1 and L2 may be replaced by an isolation transformer T1 as shown in FIG. 2. As illustrated in FIG. 2, one side of a first winding of the isolation transformer T1 is connected to the junction of the pair of switches Q1, Q2 of the first half bridge, and the other side of the first winding is connected to the junction of the pair of switches Q3, Q4 of the second half bridge. One side of a second winding of transformer T1 is connected to the junction of the pair of switches Q5, Q6 of the third half bridge, and the other side of the second winding is connected to the junction of the pair of switches Q7, Q8 of the fourth half bridge 124.

In the embodiment in which the first and second conversion stages 110 and 120 are interfaced by the inductors L1 and L2 (FIG. 1), the DC/DC converter 100 may further include an optional center point connection 150. Referring to FIG. 1, the center point connection 150 may connect the junction of the first and second half bridges 112, 114 to the junction of the third and fourth half bridges 122, 124. The center point connection 150 may be advantageous, for example, in a scenario in which the input/output 130 is connected to energy storage (e.g., battery/batteries) in that the noise on the battery terminals is reduced by the neutral center-point connection. However, there is a design trade-off to this connection in that the ripple performance (i.e. ripple current and voltage on the battery and PV ports) is compromised to some extent.

In an embodiment, each of the half bridges 112, 114, 122, 124 may be close coupled to a DC bus capacitor C1-C4 for filtering and semiconductor voltage overshoot reduction. For example, capacitor C1 is the filter capacitor for the half-bridge formed by Q1 and Q2. Each of these capacitors C1-C4 may be an individual capacitor or may be a series and parallel combination of several discrete capacitors to reach the appropriate rating.

In an embodiment, switches Q1-Q8 are semiconductor switches with back-body diodes. Examples of semiconductor switches that may be used for Q1-C8 include, but are not limited to, IGBT, MOSFETs, etc.

Figure 6:
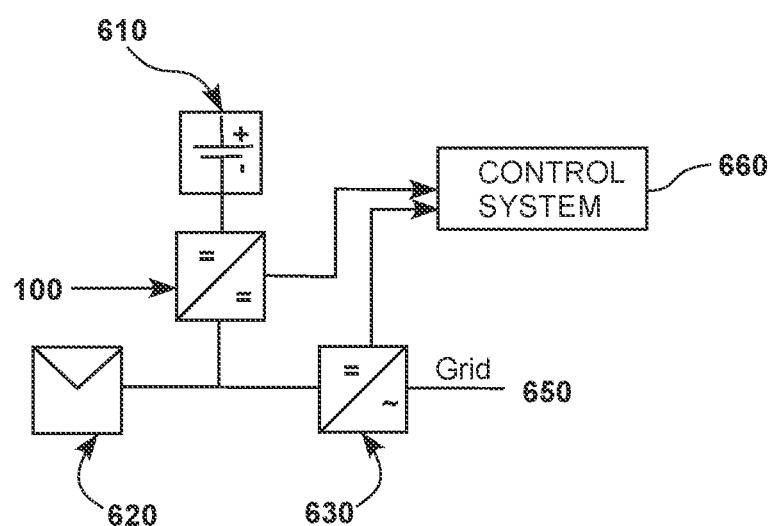
FIG. 6 is an exemplary power system employing a DC/DC converter according to an embodiment of the present invention.

In an embodiment, an energy storage unit may be provided on input/output side 130 and a PV array and/or a PV inverter may be connected on the input/output side 140. One such layout is shown in the exemplary system of FIG. 6. For example, the DC/DC converter 100 can be used between an energy storage unit 510 (such as a battery 610) and a PV array 620, and the PV array 620 may have an inverter 630 connected with a utility AC grid 650. In this particular layout, it is preferable that the power flow through the DC/DC converter 100 be bidirectional, so that the system has the capability of charging the batteries with power from the PV array, while also being capable of discharging the batteries to the grid by way of the PV inverter. In this case, the battery voltage can be either higher or lower than or roughly equal to the PV voltage with both directions of power flow. When the battery voltage is higher than the PV voltage, the battery side converter (i.e., the first conversion stage 110) is switching. When the battery voltage is lower than the PV voltage, the PV side converter is switching (i.e., the second conversion stage 120). When the voltages are equal or substantially equal (i.e. close to equal), both sides' converters switch. A determination as to whether the voltages are close to equal may be based on design considerations, and programmed into the converter's 100 control system. For example, the voltages may be determined to be substantially equal when the value obtained from subtracting the first port 130 voltage magnitude from the second port 140 voltage magnitude is less than or equal to a predetermined value. For example, if the port voltages are within 5% or less than each other, it may be determined that they are substantially the same. Therefore, either side of the DC/DC converter 100 can be used as buck or boost.

In an embodiment, control system 660 may include one or more controllers for controlling the inverter 630 and the DC/DC converter 100. In one embodiment, the control system 660 may include a single controller for controlling each of the DC/DC converter 100 and the inverter 630. In another embodiment, the control system 660 may include separate controllers for the DC/DC converter 100 and the PV inverter. The controllers of the control system 660 may be housed within the DC/DC converter 100 and/or inverter 630 or may be housed separate from one or both. A separate master controller may also be used to send signals to and/or coordinate between the one or more controllers of the DC/DC converter and inverter 630.

Figure 3:
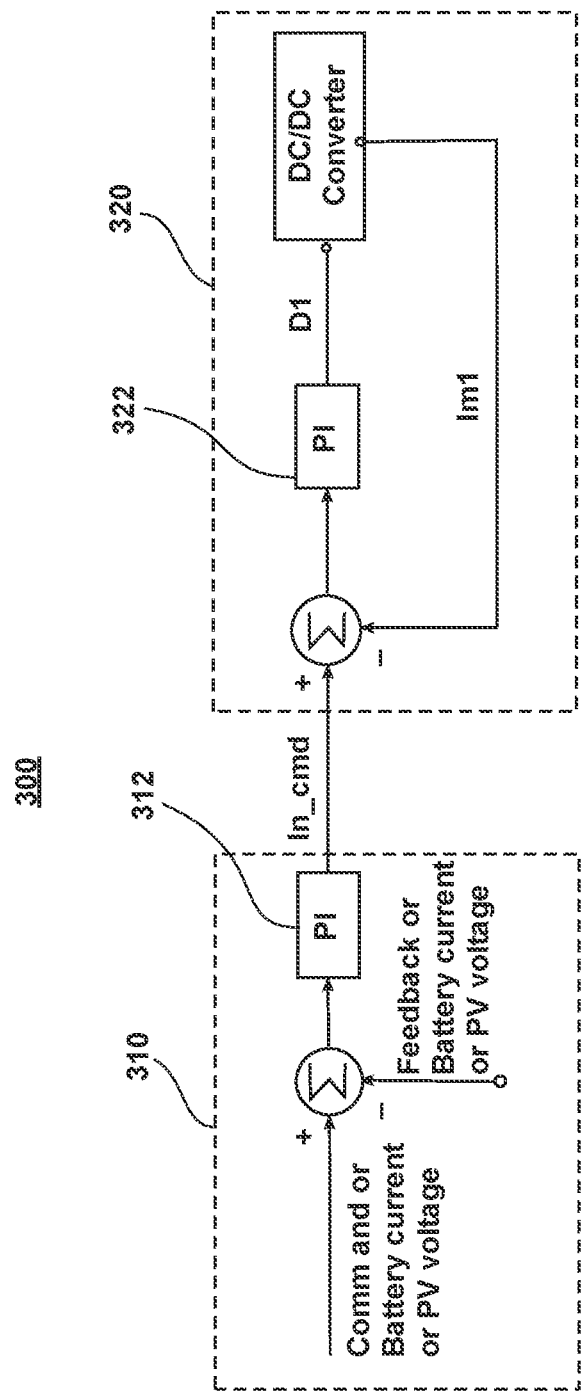
FIG. 3 is a control structure for a DC/DC converter according to an embodiment of the present invention.
Figure 4:
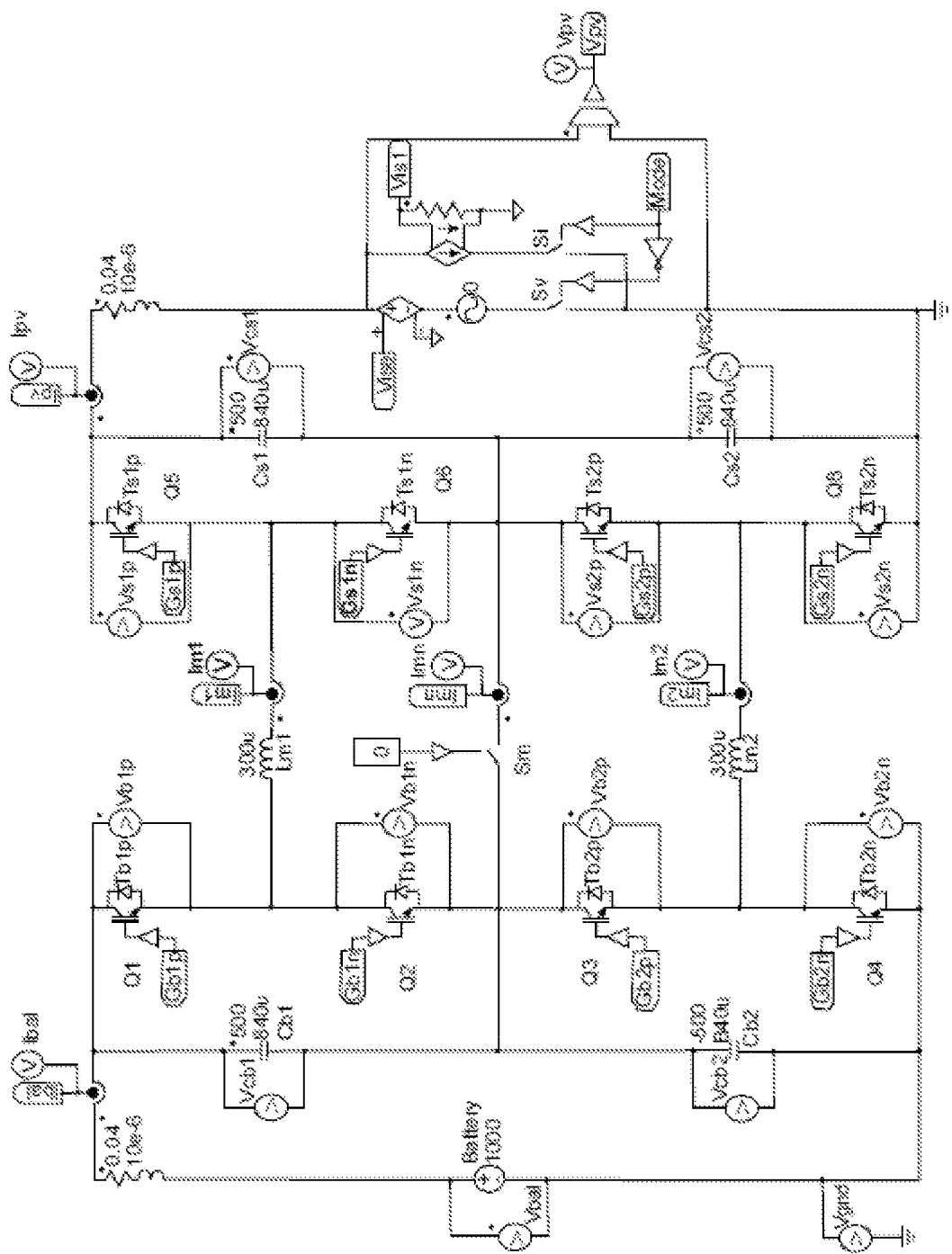
FIG. 4 is a schematic diagram of a DC/DC converter controlled by the control structure shown in FIG. 2 according to an embodiment of the present invention.

FIG. 3 shows a control structure 300 of a control system for controlling a DC/DC converter according to an embodiment of the present invention. FIG. 4 is a schematic diagram of a DC/DC converter controlled by the control structure 300 shown in FIG. 3 according to an embodiment of the present invention. FIG. 4 is similar to FIG. 1, but also includes symbols for certain measurements and gating/switching signals for sending to the switches of the DC/DC converter.

Referring to FIGS. 3 and 4, the control structure 300 includes an outer control loop 310 and an inner control loop 320. The outer loop 310 controls the magnitude of the voltage, current or power at the first port 130 or the second port 120 (in one example, this could be the magnitude of the battery/PV current or the magnitude of the battery/PV voltage). The inner loop 320 controls the interface inductor current Im1. In the exemplary embodiment shown in FIG. 4, the battery current or voltage is the current or voltage at port 130, and the PV current or voltage is the voltage or current at the port 140. The interface inductor current Im1 is the current at the interface of the first conversion stage and the second conversion stage. In the embodiment in which first and second inductors L1 and L2 are used as the interface of the first and second conversion stages 110, 120 (FIGS. 1 and 4), one or both of the interface inductor currents (e.g. Im1, Im2 or Im1 and Im2) are controlled. In the embodiment in which the first and second inductors are replaced by an isolation transformer T1 (FIG. 2), the inner loop 320 controls transformer current Im1. It should be understood that although the exemplary embodiment has battery/PV voltage or current as a source, other sources may be coupled to the ports 130 and 140, in which the case the outer loop 310 would control the voltage/current/power of one of the first and second ports 130 or 140 to which the sources are connected.

In the embodiment shown in FIG. 3, the controller parameters (e.g., the two PI parameters) may be tuned to adapt to hardware parameters. The tuning may depend on multiple factors, for example: 1) Speed of response required—the control bandwidth of the system—e.g., whether it is desirable for the converter to reach rated current in 1 ms or 100 ms; and 2) The hardware parameters of the system: inductance, capacitance and switching frequency values.

The outer control loop 310 receives as one input a command for a certain level (i.e. magnitude) of voltage, current or power at one of the first port 130 and the second port 140 (e.g. battery current or PV voltage), and receives as another input feedback of the actual level of voltage, current or power (e.g., actual magnitude of battery current or PV voltage). In the case of a command for power, power is calculated by using values obtained from voltage and current sensors at the port 130 or 140 that is being controlled. The command for the certain level (i.e. magnitude) of voltage, current or power (e.g., battery current or PV voltage) may be the desired magnitude of the voltage, current or power (e.g. desired magnitude of battery current or desired magnitude of PV voltage at the first port 130 or the second port 140). These commands may be generated internally in the DC/DC converter 100's controller based on the desired mode of operation or sent by a master controller. For example, if batteries are to be discharged, a positive battery current command may be used, and if the batteries are to be charged, a negative battery current command may be used. The feedback of battery current or PV voltage is the actual magnitude of the battery current or actual magnitude of the PV voltage that is measured at the first port 130 or the second port 140. The desired magnitude is then compared to the actual magnitude by, for example, taking the difference between the desired magnitude and actual magnitude. This difference is inputted into a controller 312 for controlling one of the interface inductor currents (e.g., Im1) through one of the inductors (e.g., Lm1). The controller 312 then outputs the current command Im_cmd for the interface inductor current to the inner control loop 320. Here, the current command Im_cmd may be viewed as a desired magnitude for the interface inductor current that can be compared to the actual magnitude of the interface inductor current in order to calculate a duty value D1 for one or more of the switching signals that are transmitted to the switches Q1-Q8 of the first and second conversion stages 110, 120.

In an embodiment in which the center-point connection 150 is installed, in addition to controlling the inductor current Im1, the control structure 300 may include additional outer and inner control loops for controlling Im2 in the same manner in which Im1 is controlled. When the center-point connection 150 is omitted, control of Im2 is not necessary, as the inductor current Im2 will be the same as Im1.

In the embodiment shown in FIG. 3, the controllers 312 and 322 are proportional-integral (PI) controllers. However, it should be understood that these controllers are not limited to PI controllers, and in fact, the controllers may be any closed loop controller including, e.g., a proportional-integral-derivative (PID) controller, a proportional (P) controller, a hysteresis controller, etc.

The inner control loop 320 receives as inputs the inductor current command Im_cmd and the actual magnitude of the inductor current Im1. The inductor current command Im_cmd is then compared to the interface inductor current Im1 by, for example, taking the difference between the inductor current command Im_cmd and the inductor current Im1. This difference is then inputted into a controller 322 for calculating a duty value D1, which can be used to generate switching signals Gb1$p$, Gb1$n$, Gb2$p$, Gb2$n$, Gs1$p$, Gs1$n$, Gs2$p$, Gs2$n$ that are input to switches Q1-Q8 (see FIG. 4). Controller 322 outputs the duty value or the switching signals Gb1$p$, Gb1$n$, Gb2$p$, Gb2$n$, Gs1$p$, Gs1$n$, Gs2$p$, Gs2$n$ to the DC/DC converter. The duty value affects the duty cycle of the signals to the switches, which affects the magnitude of the step up/step down of the DC/DC converter 100, and the duty ratio depends on the ratio of the voltages at the first port 130 and the second port 140 of the DC/DC converter 100.

When the control structure 300 calculates a duty value, current flowing from the input/output 130 may be defined as positive current (e.g., in an embodiment in which the battery is at the input/output 130, battery discharge current is defined as positive current), and the control structure may control the current of the upper interface inductor Lm1 (it should be understood that the control structure could similarly control the current of any of the interface inductors). Then the duty value (Db1) calculated from the battery side controller is for the gate of IGBT Tb1$p$ (Gb1$p$). When, for example, the duty value Db1 is 1, Tb1$p$ is fully on, and 0.5 for half on half off, and 0 for fully off. Gb1$n$ may be the reverse of Gb1$p$ with dead time. Gb2$p$/Gb2$n$ may be ascertained from Gb1$p$/Gb1$n$ in multiple ways. In one embodiment Gb2$p$/Gb2$n$ may be ascertained by reversing Gb1$p$/Gb1$n$ (i.e. Gb2$p$=Gb1$n$, Gb2$n$=Gb1$p$). In another embodiment, Gb2$p$/Gb2$n$ may be ascertained by reversing Gb1$p$/Gb1$n$ and shifting a half cycle (180 degree). Similar logic is applied for input/output side 140 switch signals.

In some situations, only diodes of some IGBTs are needed i.e. the IGBTs should be fully off. For example, when the PV side voltage is sufficiently higher than the battery side (i.e., they are not substantially equal to each other) and current is flowing from the battery side to the PV side, Ts1$p$/Ts2$n$ should be off and only Ts1$n$/Ts2$p$ are switching. In an embodiment, it is preferable to NOT turn off the switches gating (i.e., even though these switches are not needed, the switches still receive gate signals). However, the direction of the current is such that the switches do not conduct. Instead, the back body parallel diode conducts. Even though these switches are switching, there is no current through them, so there is no loss. In converters that use MOSFET's, it is desired that the MOSFET channel conduct current rather than the back body diodes—in this case, it is required that the gating not be turned OFF.

Although the control structure of FIG. 3 is able to calculate duty cycles of switching signals Gb1$p$, Gb1$n$, Gb2$p$, Gb2$n$, Gs1$p$, Gs1$n$, Gs2$p$, Gs2$n$ to get the desired output, this control system has difficulty in avoiding switching of the first conversion stage 110 and the second conversion stage 120 at the same time. When the voltage magnitudes at the port 130 (e.g., battery) and port 140 (e.g., PV array or PV inverter) are different, the switches of only one of the first conversion stage 110 and the second conversion stage 120 need to be switching. For example, only the switches of the first or second conversion stage 120 at the input/output 130 or 140 having the highest voltage need to be switching. Preferably, the switches at the other of the first and second conversion stage 110, 120 should be constant on or off (i.e., no switching). For example, considering an embodiment in which a battery is on input/output 130 and a PV array/PV inverter is on input/output side 140, if PV=1000V and Battery=500V, the battery side conversion stage 110 should not switch and the PV side conversion stage 120 will have a duty ratio of close to 0.5.

Although the control structure shown in FIG. 3 can provide control for switching both of the first and second conversion stages 120 to obtain the desired output, this control results in unnecessary switching loss (in this case, if switching all switches at both sides to make the voltage on the interface of the first and second conversion stages lower than both sides of battery and PV voltage, control can be accomplished, but switching loss occurs).

Figure 5:
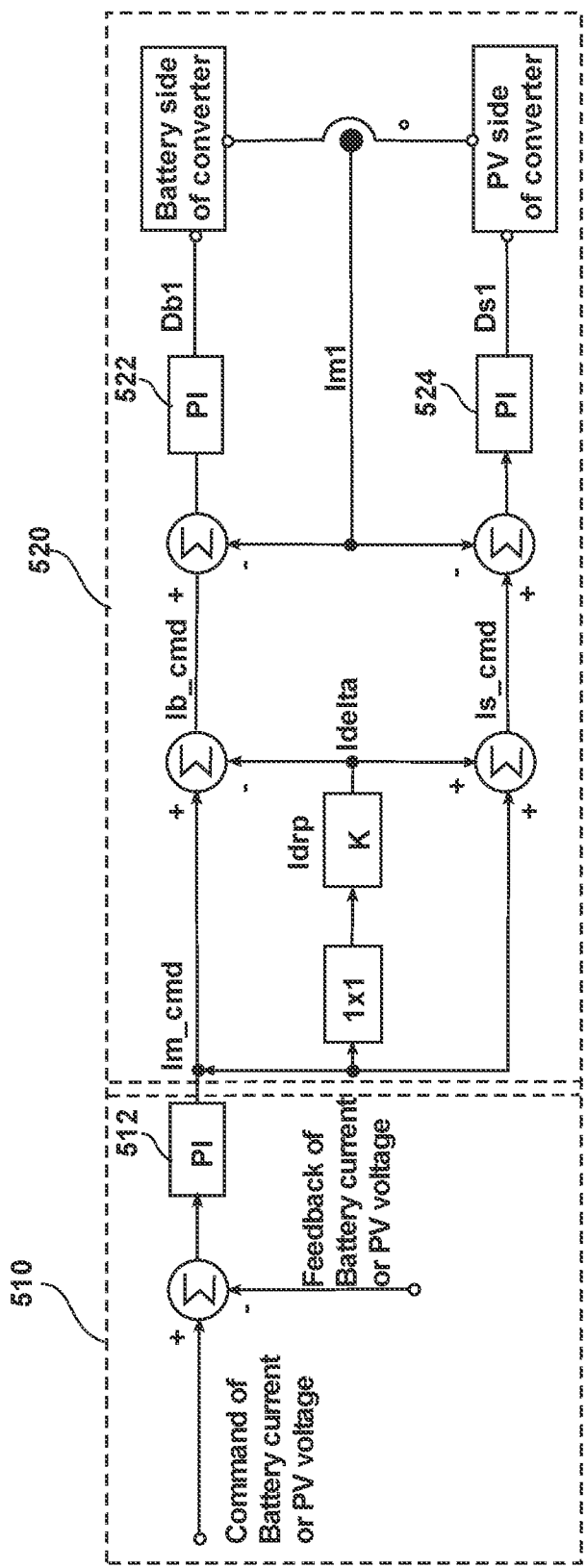
FIG. 5 is a control structure for a DC/DC converter according to an embodiment of the present invention.

FIG. 5 is a control structure 500 for a DC/DC converter according to an embodiment of the present invention. The control structure 500 of FIG. 5 controls the DC/DC converter 100 so that only one of the first conversion stage 110 and the second conversion stage 120 is switching at a time when the voltages at these conversions stages 110 and 120 are apart by the predetermined voltage magnitude, and so that both the first conversion stage 110 and the second conversion stage 120 are both switching when the voltage magnitudes at the first conversion stage 110 and the second conversion stage 120 are sufficient close (i.e., their difference is within the predetermined voltage value). In addition, the control structure of FIG. 5 provides for a smooth transition between switching of one of the conversion stages to the other of the conversion stages.

Referring to FIG. 5, the control structure 500 comprises an outer control loop unit 510 and an inner control loop unit 520. The outer control loop unit 510 controls one of the ports' (130 or 140) voltage magnitude, current magnitude or power and produces an interface inductor current command Im_cmd (in an embodiment in which the first and second inductors are replaced by an isolation transformer T1 (see FIG. 5), the inner loop 5 20 may control transformer current Im1). The inner control loop 520 receives the inductor current command Im_md and generates two different inductor current commands, i.e., a first inductor current command Ib_cmd and a second inductor current command Is_cmd by comparing the interface current command to an interface current comparison value (or in other words, by adjusting the Im_cmd value for the two ports using an interface current comparison value Idelta). The inner control loop 520 uses the first and second inductor current commands Ib_cmd and Is_cmd to generate first and second duty values Db1 and Ds1. The first duty value Db1 is for controlling the switching of the switches Q1-Q4 of the first conversion stage 110, and the second duty value Ds1 is for controlling the switching of the switches Q5-Q8 of the second conversion stage 120.

In an embodiment in which the center-point connection 150 is installed, in addition to controlling the inductor current Im1, the control structure 500 may include additional outer and inner control loops for controlling Im2 in the same manner in which Im1 is controlled. When the center-point connection 150 is omitted, control of Im2 is not necessary, as the inductor current Im2 will be the same as Im1.

In the embodiment shown in FIG. 5, the controllers 512, 522 and 524 are proportional-integral (PI) controllers. However, it should be understood that these controllers are not limited to PI controllers, and in fact, the controllers may be any closed loop controller including, e.g., a proportional-integral-derivative (PID) controller and a proportional (P) controller.

The outer control loop unit 510 receives as one input a command for voltage magnitude, current magnitude or power at one of the first and second ports 130 and 140 (e.g. battery current or PV voltage). The outer control loop unit 510 receives as another input feedback of the port 130 or 140 voltage, current or power (e.g., feedback of the battery current or PV voltage). Similar to the control structure described with reference to FIG. 3, it should be understood that the battery/PV voltage or current as a source is exemplary, and other sources may be coupled to the ports 130 and 140. The command for voltage, current or power (e.g. battery current or PV voltage) may be the desired magnitude of voltage, current or power (e.g., desired magnitude of battery current or desired magnitude of PV voltage). The feedback of voltage, current or power (e.g., battery current or PV voltage) is the actual magnitude of the voltage, current or power at the port 130 or 140 (e.g., battery current or actual magnitude of the PV voltage). The desired magnitude is then compared to the actual magnitude by, for example, taking the difference between the desired magnitude and actual magnitude. This difference is inputted into a controller 512 for controlling one of the interface inductor currents (e.g., Im1) over one of the inductors (e.g., Lm1). The controller 512 then outputs the current command Im_cmd for the interface inductor current to the inner control loop 520. Here, the current command Im_cmd may be a desired magnitude for the interface inductor current that is compared to the actual magnitude of the interface inductor current.

In the inner control loop 520, interface inductor (Lm1) current (Im1) is controlled by calculating gate duties Db1, Ds1 for switching signals sent to the switches Q1-Q8 to make the magnitude of the current Im1 equal to the magnitude of the current command Im_cmd received from the outer control loop. In the case in which the first and second ports 130 and 140 have different voltage magnitudes, the gate duties calculated by the control structure of the control system are only used for the higher voltage side switches (i.e., the switches of conversion stage connected to the port 130 or 140 having a higher voltage magnitude). The gate duties for the lower voltage side switches are a constant 1 or 0. For example, considering an embodiment in which a battery is on input/output 130 and a PV array/PV inverter is on input/output side 140, if PV=1000V and Battery=500V, the battery side conversion stage 110 should be a constant 1 or 0 switch and the PV side conversion stage 120 will switch according to the duty value Ds1.

It should be noted that, for the DC/DC converter 100 topology, if a controller makes mistakes as to which side is a higher voltage (i.e., voltage and the first conversion stage 110 or second conversion stage 120), there will be a large current disturbance. Considering the case in which the battery is connected to the first port 130 and the PV array is connected to the second port 140, it can be appreciated that the battery voltage does not change quickly, and it can be treated as constant within a few seconds. However, the PV voltage can and often does change quickly, because the PV voltage is reliant on the amount of sunlight incident on the PV array. If the voltage feedbacks into the control system have errors, it is possible to mistake which side voltage is higher (i.e., which of the voltage magnitude at the first port 130 and second port 140 is higher). Thus, a current disturbance can easily happen when the PV voltage is fast crossing the battery voltage.

The control structure of the embodiment shown in FIG. 5 is able to smoothen the transfer from one conversion stage to the other.

In the embodiment shown in FIG. 5, the inner control loop 520 includes two controllers, a first conversion stage controller 522 and a second conversion stage controller 524 (e.g., two PI controls—as noted above, the controllers are not limited to being a PI controller and can be any closed loop controller). The first conversion stage controller 522 controls a gate duty Db1 for generating switching signals that are output to switches Q1-Q4 of the first conversion stage 110, and the second conversion stage controller 524 controls a gate duty Ds1 for generating switching signals that are output to switches Q5-Q8 of the second conversion stage 120.

When implementing the control structure in the embodiment shown in FIG. 5, each of the first conversion stage 110 and the second conversion stage 120 can be thought of as wanting to control Im1 current. However, in reality, there is only one Im1 current to be controlled. By issuing different current commands for the two PI controls as shown in FIG. 5, the result of the two controllers 522 and 524 simultaneously attempting to control one current control is that the controller at the lower voltage side is always saturated and unable to control the current. Therefore, the gate duty value at lower voltage side is constant (e.g., goes up to its maximum, 1 or to the minimum, 0). That is, the lower voltage side switches are fully on or off and the higher voltage side switches are switching to control Im1. The current commands may be calculated as follows.

Ib_cmd=Im_cmd−Idelta;

Is_cmd=Im_cmd+I_delta;

Idelta is referred to as an interface current comparison value. The interface current comparison value Idelta can be set as a constant positive value. However, it is preferable to change its value with Im_cmd as in the below equation.

Idelta=Kdrp*abs(Im_cmd);

In the above equations, the interface current comparison value Idelta should be a positive value. Preferable, a minimum limit Idelta_min is set for the interface current comparison value Idelta, so that if Kdrp*abs(Im_cmd)<Idelta_min, then Idelta=Idelta_min.

The droop factor Kdrp is preferably a small ratio (e.g., 5-10%, Kdrp=0.05-0.1). Idelta_min is preferable set to 5% of rated converter current as initial value for tuning.

The duty ratios Db1 and Ds1 are normally limited to a maximum value of 1. When the voltages and the first and second port 130 and 140 are sufficiently apart (i.e., the voltage magnitudes at the first and second port 130, 140 are not substantially equal), one of the duty ratios (the side with the lower voltage) saturates to 1 and this side does not switch. The other side has a lower than 1 duty ratio and this side switches. When the voltages are substantially the same (i.e., the difference between the voltage levels at the first and second port are less than the predetermined value), the maximum duty ratios are limited to a predetermined value (e.g., limited to 0.95). This causes both sides to switch. In an embodiment, there is a hysteresis band (25V in this example) to transition from one case to another—this is to prevent rapid switching between the modes when on the edge. The control system may include the following control logic for an example in which maximum duty ratios are limited to a predetermined value of 0.95 for the case in which the first and second port 130 and 140 voltages V1 and V2 are considered substantially the same if they are less than 50V apart, and a hysteresis band of 25V is provided:

if abs(V1−V2)<25V //when voltages are sufficiently close (within 25V), limit max duty to 0.95

Db1_max=0.95 Ds1_max=0.95 else if abs(V1−V2)>50V //when voltages are sufficiently apart (more than 50V), release max duty to 1

Db1_max=1 Ds1_max=1

In accordance with the above equations, in the inner control loop 520, the interface current command Im_cmd controlled by the outer control loop is compared to/adjusted by the interface current comparison value Idelta in order to output the first and second interface current commands Ib_cmd and Is_cmd. In the embodiment of FIG. 5, the comparison to the interface current comparison value Idelta involves subtracting the interface current comparison value Idelta from the interface current command Im_cmd to generate the first interface current command Ib_cmd and adding the interface current comparison value Idelta to the interface current command Im_cmd to generate the second interface current command. The first and second interface current commands are then compared to the actual value of the interface current Im1 (e.g., the interface current over inductor L1 (FIG. 1) or the transformer current (FIG. 2) by, for example, subtracting the actual value of the interface current Im1 from these values, and the result of the comparison is output to the first and second conversion stage controllers 522 and 524. The first and second conversion stage controllers 522 then generate gate duty values Db1 and Ds1 for generating switching signals for the first and second conversion stages 110 and 120, respectively.

When controlling as above, it should be noted that the real Lm1 current Im1 can be different from the command Im_cmd. However, this is not problematic, because the final target is battery current or PV voltage, which is controlled by the outer control loop 510. The current command Im_cmd will be auto adjusted by the outer control loop 510.

For the feedback to the inner control unit, the interface current Im1 is sampled. It should be noted that the interface inductor current Im1 can include high frequency ripple. The ripple is roughly linear up/down. The ripple frequency is equal to or double of the switching frequency of the switches of the first and second conversion stages 110 and 120. The ripple amplitude depends on the ripple frequency, the magnitude of the inductances Lm1 & Lm2 and the difference between first port 130 (e.g. battery) and second port 140 (e.g. PV) voltages. If the sample frequency for Lm1 current feedback is the same as the switching frequency, the sampled value for Lm1 current can have error. Therefore, it is preferable to sample at the middle point of the ripple, as otherwise, the sampled value is different from real average current. However, in any event, since Lm1 is not the final target, the outer control loop—which receives as inputs both the final target value (e.g., battery current or PV voltage) and its actual value—will auto adjust for errors in the Lm1 current.

When the DC/DC converter 100 is coupled to an energy storage (e.g., battery) and a PV array/inverter, for the outer control loop 310, the control target can be battery current or PV voltage, and the control structure 500 can transfer between these two targets depending on which one the user wants to control. When the target is battery current, the actual battery current is sampled for the feedback in the outer loop 310; and when the target is PV voltage, actual PV voltage is sampled for the feedback in the outer loop 310. It should be noted that when battery current is sampled, this sampling is more critical than when sampling the interface inductor L1 current for the inner loop. Because interface inductor current Im1 is not the final target, the accuracy of Im1 current sampling is not as significant, because, as mentioned above, the outer control loop 510 will auto adjust for the inner control loop 520. Because battery current is the final target, its' accuracy when sampling is more significant.

As discussed above, on the terminals of the first conversion stage 110 (e.g., the battery side of the converter), there are capacitors C1 and C2. When there is current between the battery and the DC/DC converter, the (battery) current will include some ripples or oscillations. The ripple frequency is the switching frequency (or double). Assuming the switching frequency is fixed, the battery current ripple amplitude mainly depends on the impedance between the battery and the capacitors of the converter. If the capacitors on the battery side of the converter are not large enough or/and the switching frequency is not high enough, the battery current ripple may be over the specification. An additional inductor may be provided between the battery and the converter.

Besides the fact that the battery current feedback needs more accuracy than Lm1 current, the middle point of the battery current moves when the impedance between the battery and the converter changes. Thus, it is difficult to sample the middle point of the battery current or to correct the error caused by sampling at the wrong point of the battery current. Therefore, in an embodiment, the battery current for the feedback is sampled at a higher frequency than the switching frequency of the switches of the first and second conversion stages 110 and 120. For example, in an embodiment, 16 points of the battery current are sampled during one switching cycle, and then the average of these 16 points is calculated and provided as the feedback for the battery current control. An increase in the number of sampling points can increase the delay and slow down the battery current control. Therefore, the number of sampling points may be determined based on the response time that is desired. Furthermore, if the battery current ripple is high, the number of sampling points may be increased.

Figure 7:
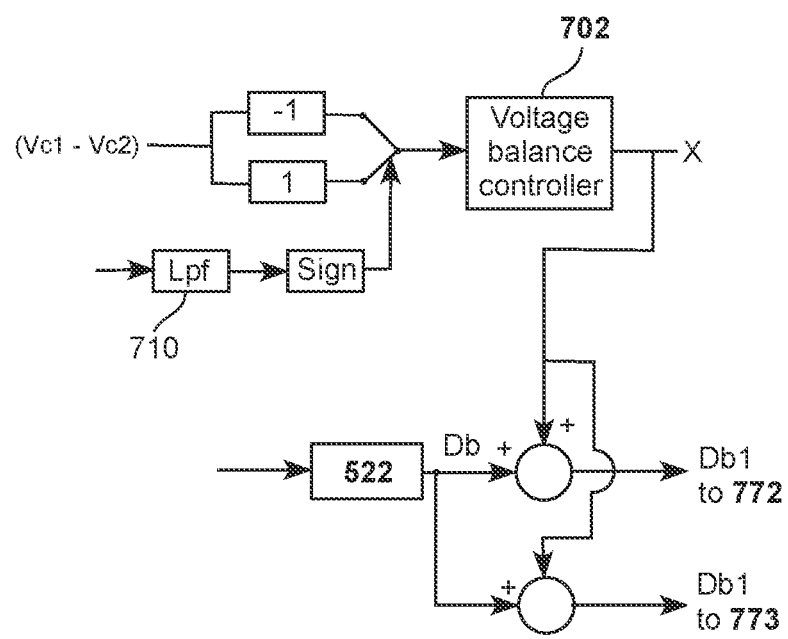
FIG. 7 is a control structure for controlling the voltage difference between the voltage across capacitors of the first and second port according to an embodiment of the present invention.

FIG. 7 is a control structure/system for controlling the voltage difference between the voltage across capacitors of the first and second port according to an embodiment of the present invention. It is desirable to maintain the difference between the voltage over capacitor C1 and the voltage over capacitor C2 on the first port 130 (and similarly the voltage over capacitor C3 and the voltage over capacitor C4 on the second port 140) close to zero. FIG. 7 shows a control structure/system that can be provided along with the control structure of FIG. 3 or FIG. 5 to achieve this. This control structure 700 can be provided in on the same or separate physical controller as the control structure of FIG. 5.

Referring to FIG. 7, the voltages across capacitors C1 and C2 (FIGS. 1 and 2) are measured and their difference is calculated (Vc1−Vc2). This value is then multiplied by 1 if the direction of the current flow in inductor L1 is from port 130 to port 140. Current in L2 or current in transformer T1 may also be used for this purpose. If the current flow is in the reverse direction, then the voltage difference is multiplied by a −1 instead. A low-pass filter 710 may be used to filter the measured current and the direction of the filtered current may also be used.

The value thus obtained is then inputted into a controller 702 for calculating the duty ratio offset that must be applied to the duty ratio obtained from controller 522 (in FIG. 5). The output of this controller is added to the output of controller 522 for generating the switching signals for the switches Q1 and Q2 of the first half bridge 112 and subtracted from the output of the controller 522 for generating the switching signals for the switches Q3 and Q4 of the second half bridge 114.

The controller 702 may be a closed loop controller such as a PI controller, a proportional-integral-derivative (PID) controller, a proportional (P) controller, a hysteresis controller, etc.

A similar approach is taken to maintain a close to zero voltage difference between capacitors C3 and C4 of port 140. The voltages across capacitors C3 and C4 are measured and their difference is calculated (Vc3−Vc4). This value is then multiplied by 1 if the direction of the current flow in inductor L1 is from port 130 to port 140. Current in L2 or current in transformer T1 may also be used for this purpose. If the current flow is in the reverse direction, then the voltage difference is multiplied by −1 instead. A low pass filter may be used to filter the measured current and the direction of the filtered current (sign) may also be used.

The value thus obtained is then inputted into a controller for calculating the duty ratio offset that should be applied to the duty ratio obtained from controller 524 (in FIG. 5). The output of this controller is subtracted from the output of controller 524 for generating the switching signals for the third half bridge 122 and added to the output of 524 for generating the switching signals for the fourth half bridge 124.

Although in certain exemplary embodiments discussed above, the DC/DC converter 100 is described as being coupled between energy storage and a PV array/inverter, it should be understood the present invention is not limited to this application. It will be readily understood to a person of ordinary skill in the art that embodiments of the present invention are suitable for additional applications, such as applications where DC/DC conversion is required with overlapping voltages on the first and second 130 and 140 input/output sides. Additional examples include back up power in variable frequency drives (VFD) applications. The DC/DC converter may be interfaced with a VFD's DC bus. When the grid voltage is present, the DC bus voltage is established by the grid and the VFD is feeding the motor. When the grid goes away (e.g., a power outage), the DC/DC converter can hold up the DC bus by discharging the batteries into the VFD, allowing the VFD to run without interruption.

The control structure 300 and 500 may be embodied on a controller such as a digital signal processor (DSP), field programmable gate array (FPGA), etc. However, is should be understood the controller is not limited to these, and can be any type of digital processor or analog or mixed signal circuit. In addition, the control structure 300 and 500 may be embodied on a single controller or a plurality of controllers (e.g., separate controllers for the outer and inner loop).

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A DC/DC converter, comprising:
a first port defining a first terminal and a second terminal;
a first half-bridge and a second half-bridge connected together at a node,
the first half-bridge including two switches connected together at a junction, the first switch of the first half-bridge connected to the first terminal of the first port, and the second switch of the first half-bridge connected to the node of the first half-bridge and the second half-bridge,
the second half-bridge including two switches connected together at a junction, the first switch of the second half-bridge connected to the node of the first half-bridge and the second half-bridge, and the second switch of the second half-bridge connected to the second terminal of the first port;
a second port defining a first terminal and a second terminal;
a third half-bridge and a fourth half-bridge connected together at a node,
the third half-bridge including two switches connected together at a junction, the first switch of the third half-bridge connected to the first terminal of the second port, and the second switch of the third half-bridge connected to the node of the third half-bridge and the fourth half-bridge,
the fourth half-bridge including two switches connected together at a junction, the first switch of the fourth half-bridge connected to the node of the third half-bridge and the fourth half-bridge, and the second switch of the fourth half-bridge connected to the second terminal of the second port;
the junction of the two switches of the first half-bridge being connected to the junction of the two switches of the third half-bridge.

2. The DC/DC converter of claim 1, wherein
the first half-bridge and the second half-bridge are connected together in series between the first terminal of the first port and the second terminal of the first port, and
the third half-bridge and the fourth half-bridge are connected together in series between the first terminal of the second port and the second terminal of the second port.

3. The DC/DC converter of claim 1, wherein
the junction of the two switches of the second half-bridge being connected to the junction of the two switches of the fourth half-bridge.

4. The DC/DC converter of claim 3, wherein
the first switch of the first half-bridge and the second switch of the first half-bridge are connected in series between the first terminal of the first port and the node of the first half-bridge and the second half-bridge, and
the first switch of the second half-bridge and the second switch of the second half-bridge are connected in series between the second terminal of the first port and the node of the first half-bridge and the second half-bridge.

5. The DC/DC converter of claim 4, wherein
the first switch of the third half-bridge and the second switch of the third half-bridge are connected in series between the first terminal of the second port and the node of the third half-bridge and the fourth half-bridge, and
the first switch of the fourth half-bridge and the second switch of the fourth half-bridge are connected in series between the second terminal of the second port and the node of the third half-bridge and the fourth half-bridge.

6. The DC/DC converter of claim 3, comprising:
a first inductor connected to the junction connecting the two switches of the first half-bridge and connected to the junction connecting the two switches of the third half-bridge; and
a second inductor connected to the junction connecting the two switches of the second half-bridge and connected to the junction connecting the two switches of the fourth half-bridge.

7. The DC/DC converter of claim 1, comprising:
a first capacitor connected between the first terminal of the first port and the node of the first half-bridge and the second half-bridge;
a second capacitor connected between the second terminal of the first port and the node of the first half-bridge and the second half-bridge;

a third capacitor connected between the first terminal of the second port and the node of the third half-bridge and the fourth half-bridge;

a fourth capacitor connected between the second terminal of the second port and the node of the third half-bridge and the fourth half-bridge.

8. The DC/DC converter of claim 1, wherein the node of the first half-bridge and the second half-bridge is connected to the node of the third half-bridge and the fourth half-bridge.

9. The DC/DC converter of claim 1, wherein
the first half-bridge and the second half-bridge define a set of cascaded half-bridges, and
the third half-bridge and the fourth half-bridge define a set of cascaded half-bridges.

10. The DC/DC converter of claim 1, wherein
one of the first port and the second port is configured and adapted to connect to an electrical energy source, and
the other of the first port and the second port is configured and adapted to connect to a load.

11. The DC/DC converter of claim 1, wherein
one of the first port and the second port is configured and adapted to connect to a battery, and
the other of the first port and the second port is configured and adapted to connect to a photovoltaic array.

12. The DC/DC converter of claim 1, wherein
the junction of the two switches of the second half-bridge are connected to the junction of the two switches of the fourth half-bridge,
the first half-bridge and the second half-bridge are connected together in series between the first terminal of the first port and the second terminal of the first port,
the third half-bridge and the fourth half-bridge are connected together in series between the first terminal of the second port and the second terminal of the second port,
the first switch of the first half-bridge and the second switch of the first half-bridge are connected in series between the first terminal of the first port and the node of the first half-bridge and the second half-bridge, and
the first switch of the second half-bridge and the second switch of the second half-bridge are connected in series between the second terminal of the first port and the node of the first half-bridge and the second half-bridge,
the first switch of the third half-bridge and the second switch of the third half-bridge are connected in series between the first terminal of the second port and the node of the third half-bridge and the fourth half-bridge,
the first switch of the fourth half-bridge and the second switch of the fourth half-bridge are connected in series between the second terminal of the second port and the node of the third half-bridge and the fourth half-bridge, and
the node of the first half-bridge and the second half-bridge is connected to the node of the third half-bridge and the fourth half-bridge.

13. The DC/DC converter of claim 12, comprising:
a first inductor connected to the junction connecting the two switches of the first half-bridge and connected to the junction connecting the two switches of the third half-bridge; and
a second inductor connected to the junction connecting the two switches of the second half-bridge and connected to the junction connecting the two switches of the fourth half-bridge.

14. The DC/DC converter of claim 13, comprising:
a first capacitor connected between the first terminal of the first port and the node of the first half-bridge and the second half-bridge;
a second capacitor connected between the second terminal of the first port and the node of the first half-bridge and the second half-bridge;
a third capacitor connected between the first terminal of the second port and the node of the third half-bridge and the fourth half-bridge; and
a fourth capacitor connected between the second terminal of the second port and the node of the third half-bridge and the fourth half-bridge.

15. A DC/DC converter, comprising:
four half-bridges, each half-bridge including three ports and a pair of switches, the pair of switches being connected to one another at a junction, the pair of switches being connected between a first port and a second port of the three ports, and the junction between the pair of switches being connected to a third port of the three ports;
wherein a first pair of the four half-bridges are connected in series with a first external electrical device, and the connections between the first pair of the four half-bridges and the first external electrical device are made with the first port of each half-bridge of the first pair of the four half-bridges being connected to the first external electrical device and the second ports of the three ports of each half-bridge of the first pair of the four half-bridges being connected to one another;
wherein a second pair of the four half-bridges are connected in series with a second external electrical device, and the connections between the second pair of the four half-bridges and the second external electrical device are made with the first port of each half-bridge of the second pair of the four half-bridges being connected to the second external electrical device and the second ports of the three ports of each half-bridge of the second pair of the four half-bridges being connected to one another;
wherein the third port of one of the half-bridges in the first pair of half-bridges is connected to the third port of one of the half-bridges in the second pair of half-bridges.

16. The DC/DC converter of claim 15, wherein
the third port of the other of the half-bridges in the first pair of half-bridges is connected to the third port of the other of the half-bridges in the second pair of half-bridges.

17. The DC/DC converter of claim 16, wherein the pair of switches in each half-bridge are connected to one another in series.

18. The DC/DC converter of claim 16, wherein the first external device is an energy storage device.

19. The DC/DC converter of claim 18, wherein the first external device is a battery.

20. The DC/DC converter of claim 16, wherein the second external device is a photovoltaic array.

21. The DC/DC converter of claim 16, wherein the second external device is an electrical load.

22. The DC/DC converter of claim 16, wherein one of the first pair of half-bridges is connected to a first inductor, and one of the second pair of half-bridges is connected to the first inductor.

23. The DC/DC converter of claim 22, wherein the other of the first pair of half-bridges is connected to a second inductor, and the other of the second pair of half-bridges is connected to the second inductor.

24. The DC/DC converter of claim 16, comprising:
a first capacitor; and
a second capacitor;
wherein
- the first pair of the four half-bridges is connected between a first terminal of the first external electrical device and a second terminal of the first external electrical device,
- the first capacitor is connected between the first terminal of the first external electrical device and the junction between the first pair of the four half-bridges, and
- the second capacitor is connected between the second terminal of the first external electrical device and the junction between the first pair of the four half-bridges.

25. The DC/DC converter of claim 15, comprising:
a first inductor;
a second inductor;
a first capacitor;
a second capacitor;
a third capacitor;
a fourth capacitor;
wherein
- the third port of the other of the half-bridges in the first pair of half-bridges is connected to the third port of the other of the half-bridges in the second pair of half-bridges,
- the pair of switches in each half-bridge are connected to one another in series,
- one of the first pair of half-bridges is connected to a first inductor, and one of the second pair of half-bridges is connected to the first inductor, and the other of the first pair of half-bridges is connected to a second inductor, and the other of the second pair of half-bridges is connected to the second inductor,
- the first pair of the four half-bridges is connected between a first terminal of the first external electrical device and a second terminal of the first external electrical device,
- the first capacitor is connected between the first terminal of the first external electrical device and the junction between the first pair of the four half-bridges,
- the second capacitor is connected between the second terminal of the first external electrical device and the junction between the first pair of the four half-bridges,
- the second pair of the four half-bridges is connected between a first terminal of the second external electrical device and a second terminal of the second external electrical device,
- the third capacitor is connected between the first terminal of the second external electrical device and the junction between the second pair of the four half-bridges, and
- the fourth capacitor is connected between the second terminal of the second external electrical device and the junction between the second pair of the four half-bridges.

* * * * *